US007574293B2

United States Patent
Vredevoogd et al.

(10) Patent No.: US 7,574,293 B2
(45) Date of Patent: Aug. 11, 2009

(54) SYSTEM AND METHOD FOR IDENTIFYING TIRE POSITION ON A VEHICLE

(75) Inventors: Loren D. Vredevoogd, Holland, MI (US); Brian S. Honeck, Holland, MI (US); Thierry Pinard, Garches (FR); Regis Boutroy, Montivilliers (FR)

(73) Assignee: Johnson Controls Technology Company, Holland, MI (US)

( * ) Notice: Subject to any disclaimer, the term of this patent is extended or adjusted under 35 U.S.C. 154(b) by 750 days.

(21) Appl. No.: 10/782,539

(22) Filed: Feb. 19, 2004

(65) Prior Publication Data

US 2005/0187667 A1  Aug. 25, 2005

(51) Int. Cl.
*G06F 7/00* (2006.01)
(52) U.S. Cl. .................. 701/36; 340/442; 340/445; 702/148; 73/146; 73/600
(58) Field of Classification Search ................. 340/438, 340/442, 447, 436, 426.3, 444, 472, 445; 701/32, 36; 73/146, 600; 280/727, 734; 702/148
See application file for complete search history.

(56) References Cited

U.S. PATENT DOCUMENTS

| | | | | | |
|---|---|---|---|---|---|
| 3,974,018 | A | * | 8/1976 | Arimura et al. | 156/394.1 |
| 4,275,589 | A | * | 6/1981 | Dugger et al. | 73/146 |
| 5,095,744 | A | * | 3/1992 | Macecek et al. | 73/146 |
| 5,942,681 | A | * | 8/1999 | Vollenweider et al. | 73/146.2 |
| 6,489,888 | B1 | * | 12/2002 | Honeck et al. | 340/442 |
| 6,591,671 | B2 | * | 7/2003 | Brown | 73/146.5 |
| 6,731,205 | B2 | * | 5/2004 | Schofield et al. | 340/444 |
| 6,988,026 | B2 | * | 1/2006 | Breed et al. | 701/29 |
| 6,997,048 | B2 | * | 2/2006 | Komatsu et al. | 73/146.2 |
| 7,289,022 | B2 | * | 10/2007 | Ogawa et al. | 340/447 |
| 2003/0001735 | A1 | * | 1/2003 | Honeck et al. | 340/445 |
| 2003/0030553 | A1 | * | 2/2003 | Schofield et al. | 340/442 |
| 2003/0058118 | A1 | * | 3/2003 | Wilson | 340/679 |
| 2003/0107481 | A1 | * | 6/2003 | Sawafuji | 340/442 |
| 2003/0149515 | A1 | * | 8/2003 | Hessmert et al. | 701/29 |
| 2004/0130442 | A1 | * | 7/2004 | Breed et al. | 340/443 |

(Continued)

FOREIGN PATENT DOCUMENTS

DE 10017621 A1 * 10/2001

(Continued)

OTHER PUBLICATIONS

New Automotive Sensors—A Review; Fleming, W.J.; Sensors Journal, IEEE, vol. 8, Issue 11, Nov. 2008 pp. 1900-1921; Digital Object Identifier 10.1109/JSEN.2008.2006452.*

(Continued)

*Primary Examiner*—Cuong H Nguyen
(74) *Attorney, Agent, or Firm*—Foley & Lardner LLP (57) ABSTRACT

A method of determining the position of a tire on a vehicle using signal pulses is described. The method includes receiving a plurality of signal pulses from a transmitter associated with the tire in the time the tire completes approximately one rotation, providing at least one predetermined signal pattern associated with a unique tire position on the vehicle, and comparing the plurality of signal pulses to the predetermined signal pattern to determine the position of the tire on the vehicle.

15 Claims, 3 Drawing Sheets

U.S. PATENT DOCUMENTS

| | | | |
|---|---|---|---|
| 2004/0246117 A1* | 12/2004 | Ogawa et al. | 340/445 |
| 2005/0187667 A1* | 8/2005 | Vredevoogd et al. | 701/1 |
| 2005/0273218 A1* | 12/2005 | Breed et al. | 701/2 |
| 2006/0244581 A1* | 11/2006 | Breed et al. | 340/447 |
| 2007/0156312 A1* | 7/2007 | Breed et al. | 701/29 |
| 2007/0156320 A1* | 7/2007 | Breed et al. | 701/70 |

FOREIGN PATENT DOCUMENTS

| | | | |
|---|---|---|---|
| EP | 1319531 A2 * | 6/2003 | |
| JP | 2003165317 A * | 6/2003 | |
| JP | 2003175711 A * | 6/2003 | |
| JP | 2003220809 A * | 8/2003 | |
| JP | 2004224160 A * | 8/2004 | |
| JP | 2005153652 A * | 6/2005 | |
| JP | 2007331586 A * | 12/2007 | |
| JP | 2007331604 A * | 12/2007 | |
| JP | 2008074164 A * | 4/2008 | |
| KR | 2003051144 A * | 6/2003 | |
| TW | 533148 A * | 5/2003 | |

OTHER PUBLICATIONS

Digital signal processing techniques in truck tire vibration and sound analysis; Eberhardt, A.; Reiter, W., Jr.; Acoustics, Speech, and Signal Processing, IEEE International Conference on ICASSP '76. vol. 1, Apr. 1976 pp. 760-763.*

Scale-model vehicle analysis using an off-the-shelf scale-model testing apparatus; O'Brien, R.T., Jr.; Piepmeier, J.A.; Hoblet, P.C.; Burns, S.R.; George, C.E.; American Control Conference, 2004. Proceedings of the 2004; vol. 4, Jun. 30-Jul. 2, 2004 pp. 3387-3392 vol. 4.*

* cited by examiner

SYSTEM AND METHOD FOR IDENTIFYING TIRE POSITION ON A VEHICLE

BACKGROUND OF THE DISCLOSURE

A typical tire pressure monitoring system can include a tire monitor and a plurality of tire sensors coupled to each of a plurality of tires on a vehicle. The tire monitor communicates with the tire sensors to receive information related to each of the plurality of tires.

Each tire sensor can include a tire pressure sensor inserted into the tire and a transmitter circuit. The tire sensors sense tire pressure and generate radio frequency signals in the form of a wireless signal. This wireless signal can include a tire identification number and the sensed tire pressure. The wireless signal is transmitted by the transmitter circuit from the tire sensor to the tire monitor.

The tire monitor can include a receiver circuit coupled to the vehicle for receiving the wireless signals from the tire sensors. The tire monitor can process the wireless signals following reception by, for example, displaying the tire pressures of each tire, providing warnings when tire pressures are outside predetermined parameters, etc.

One of the challenges facing such tire pressure monitoring systems is how to train the receiver circuit to distinguish between wireless signals sent from tire sensors on the vehicle and wireless signals sent from tire sensors of nearby vehicles. Another challenge is to determine the position of each tire sensor on the vehicle, e.g. whether a particular tire sensor is positioned in the front-right, front-left, rear-right, or rear-left position.

Current developments have been made on methods and systems that determine the position of tire sensors on the vehicle by comparing characteristics of incoming wireless signals sent by the tire sensors with the characteristics expected for a wireless signal from each tire sensor respectively positioned at the possible tire sensor positions on a vehicle. In order for such comparison algorithms to work, the wireless signal is sampled continuously during the rotation of the tire, such that characteristics can be obtained for a plurality of tire positions as the tire sensor rotates with the tire.

Occasionally, the wireless signals transmitted by tire sensors are not received by the tire monitor because of interference. Accordingly, it would be desirable to increase the transmission strength of the wireless signals. However, the United States Federal Communications Commission (FCC) limits the transmission strength of wireless signals for transmitters of the type used by a tire sensor. The FCC limits the average transmission strength over a defined transmission period to a specific level. The shorter the duration of the actual signal transmission, the more powerfully the signal can be transmitted. In addition, the resolution and reliability of the system generally improves with increased transmitter signal strength.

Increased signal strength and/or continual transmission of signals can prematurely drain a battery included in each tire sensor. Replacement of batteries in the tire sensors can be expensive. Further, the placement of the tire sensors may be relatively inaccessible and may require that users return the vehicle to a servicing center for battery replacement, adding additional expense.

Accordingly, there is a need for a system and method for identifying tire position on a vehicle including tire sensors having increased transmitter signal strength while remaining FCC compliant. Further, there is a need for this type of tire sensor that conserves power to prolong battery life. Even further, there is a need to improve the performance of tire pressure monitoring systems by increasing the power of signal transmission and therefore the performance of the system. The teachings herein below extend to those embodiments which fall within the scope of the appended claims, regardless of whether they accomplish one or more of the above mentioned needs.

SUMMARY OF EXEMPLARY EMBODIMENTS

According to exemplary embodiment, a method of determining the position of a tire on a vehicle using signal pulses is described. The method includes receiving a plurality of signal pulses from a transmitter associated with the tire in the time the tire completes approximately one rotation, providing at least one predetermined signal pattern associated with a unique tire position on the vehicle, and comparing the plurality of signal pulses to the predetermined signal pattern to determine the position of the tire on the vehicle.

According to another exemplary embodiment, a system for determining the position of a tire on a vehicle using a periodically transmitted signal is described. The system includes a transmitter circuit associated with the tire configured to transmit a plurality of signal pulses in the time the associated tire completes approximately one rotation, a receiver circuit configured to receive the plurality of signal pulses, a memory configured to store a plurality of predetermined signal patterns, each predetermined signal pattern associated with a unique tire position on the vehicle, and a processing circuit configured to compare the plurality of signal pulses to at least one of the predetermined signal patterns, and to determine the position of the tire on the vehicle based on the comparison.

According to another exemplary embodiment, a system for determining the position of a tire on a vehicle using a plurality of signal pulses is described. The system includes a memory configured to store a plurality of predetermined signal patterns, each predetermined signal pattern associated with a unique tire position on the vehicle. The system further includes a circuit configured to determine the times of transmission of the plurality of signal pulses, to detect the plurality of signals at approximately the determined times, to compare the plurality of signal pulses to at least one of the predetermined signal patterns, and to determine the position of the tire on the vehicle based on the comparison.

According to yet another exemplary embodiment, a method of determining the position of a tire on a vehicle using signal pulses is described. The method includes determining the timing of transmissions for a plurality of signal pulses transmitted by a transmitter associated with the tire, detecting the plurality of signal pulses at approximately the determined timing, determining at least one predetermined signal pattern associated with a unique tire position on the vehicle, and comparing the plurality of signal pulses to the predetermined signal pattern to determine the position of the tire on the vehicle.

BRIEF DESCRIPTION OF THE DRAWINGS

The invention will become more fully understood from the following detailed description of exemplary embodiments, taken in conjunction with the accompanying drawings, wherein like reference numerals refer to like parts, and in which.

DETAILED DESCRIPTION OF EXEMPLARY EMBODIMENTS

Figure 1:
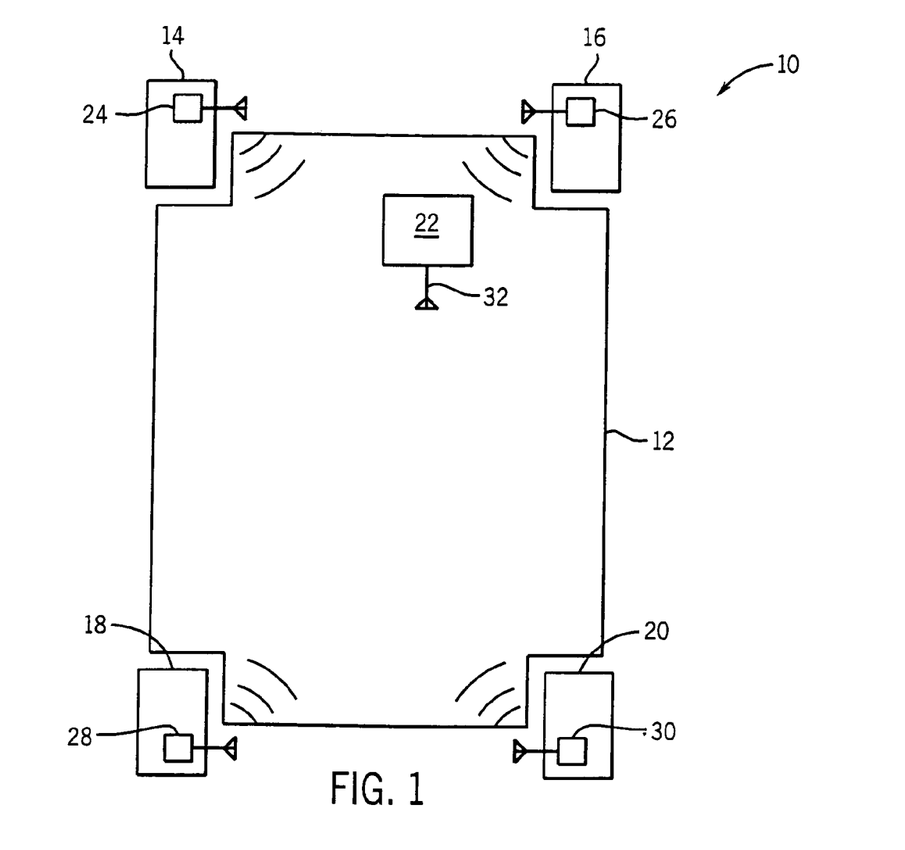
FIG. 1 is a schematic diagram of a vehicle including a tire monitoring system having a system for determining the position of a tire on a vehicle, according to an exemplary embodiment.

Referring first to FIG. 1, a tire monitoring system 10 is illustrated on a vehicle 12. Tire monitoring system 10 is configured to monitor one or more characteristics of one or more tires 14, 16, 18, 20, such as, tire pressure, temperature, alignment, tread wear, etc. Tire monitoring system 10 is a wireless system, which utilizes radio frequency, infrared, or other wireless signal transmission technology to provide tire characteristic data from tires 14-20 to a tire monitor 22. Thus, tire monitoring system 10 includes a plurality of tire sensors 24, 26, 28, 30, each coupled to one of tires 14-20. Tire sensors 24-30 are configured to sense one or more characteristics of tires 14-20, respectively, and to provide tire characteristic data wirelessly to tire monitor 22 using a transmitter circuit. A transmitter circuit may be a circuit including any type of wireless transmitter for transmitting data to tire monitor 22.

Tire monitor 22 includes a single antenna 32 in this exemplary embodiment for receiving wireless signals from one or more of tire sensors 24-30. In alternative embodiments, multiple antennas may be coupled to tire monitor 22 for receiving wireless signals at a plurality of locations on vehicle 12. For example, tire monitor 22 may include four antennas, one disposed in the vicinity of each of tire sensors 24-30.

Tire monitor 22 is configured to receive wireless signals from one or more of tire sensors 24-30, to monitor the tire characteristic data on the wireless signals, and to selectively display tire characteristic data to an operator of vehicle 12. For example, tire monitor 22 may receive tire pressure data from tire sensors 24-30 and may monitor the tire pressure data to determine if the tire pressure of any of tires 14-20 is greater than or less than predetermined maximum and/or minimum thresholds and may provide a display and associated alarm (visible, audible, etc.) to the operator of vehicle 12. The alarm indicates to the operator that maintenance of the tire causing the alarm may be needed.

Each of tire sensors 24-30 is configured to transmit tire identification data, which may be any type of message uniquely identifying the tire. For example, a tire identification of "000f", in hexadecimal representation, may indicate a first tire, while a tire identification of "01af" may identify a different tire. Each of tire sensors 24-30 is further configured to transmit a localization signal, which is a signal transmitted at a single signal strength. Tire monitor 22 is configured to receive the localization signal and to identify a location of the tire on vehicle 12 to provide more meaningful tire data to the operator of vehicle 12. For example, tire monitor 22 may associate a tire identification of "000f" with the vehicle position of "left front", and display the tire pressure data associated with tire "000f" along with a display indicating that the tire is the left front tire, such as, "LF 28". In this manner, useful information can be provided to the operator of vehicle 12 to determine alarm conditions, such as, "LF LOW", "RR LOW", etc. Identifying a location of the tire on vehicle 12 is further discussed below with reference to FIG. 3.

According to an exemplary embodiment, each of tire sensors 24-30 sends a localization signal as a series of pulses in a periodic signal (a pulsed signal, described further below with reference to FIG. 3) as it rotates with the tire. A localization signal can be any radio frequency signal that may or may not contain data. Tire monitor 22 is configured to determine the timing of transmission for each of tire sensors 24-30 and to detect the signal only during the timed signal pulses. Accordingly, both tire monitor 22 and tire sensors 24-30 can be configured to include timing circuits. Pulsed signals and synchronization are discussed further below with reference to FIG. 3.

Figure 2:
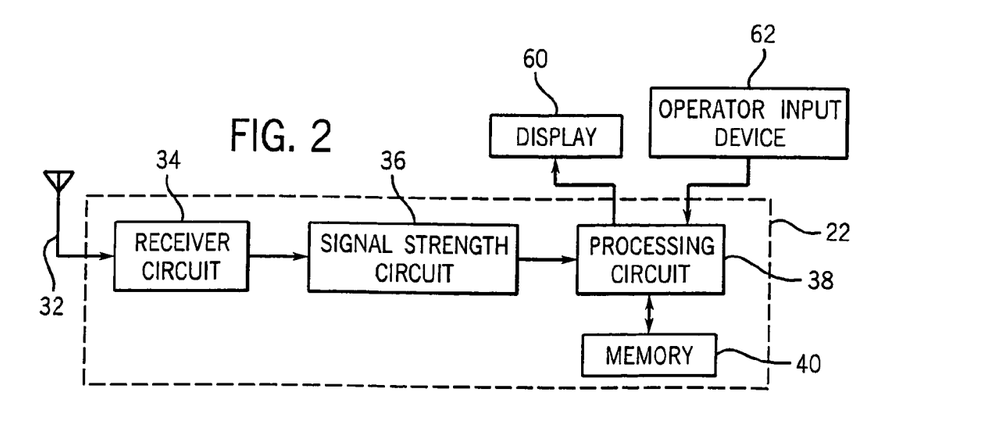
FIG. 2 is a block diagram of the system for determining the position of a tire on a vehicle of FIG. 1, according to an exemplary embodiment.

Referring now to FIG. 2, a block diagram of tire monitor 22 is illustrated according to an exemplary embodiment. Tire monitor 22 includes a receiver circuit 34, a signal strength circuit 36, a processing circuit 38, and a memory 40. Circuits 34, 36, and 38 and memory 40 are illustrated in block form to indicate that these elements are functional units which may be embodied in hardware circuitry, software, or other processing elements. For example, circuits 34, 36, and 38 and memory 40 may be disposed on one or more integrated circuits, and may be part of a system-on-chip (SOC), and may further include programmable logic, microprocessors, microcontrollers, or other control circuitry. Furthermore, memory 40 may include volatile memory portions and non-volatile memory portions, and may include random access memory, read-only memory, and other memory types. Further still, one or more of circuits 34, 36 and 38 and memory 40 can be configured in alternative embodiments to carry out some or all of the functions ascribed herein to others of circuits 34, 36 and 38 and memory 40.

Receiver circuit 34 is configured to receive wireless signals via antenna 32 from tire sensors 24-30. Portions of receiver circuit 34 may be duplicated to receive wireless signals from a plurality of antennas simultaneously. Wireless signals can include at least data messages and/or localization signals. Data messages generally contain information related to a tire associated with the tire sensor transmitting the message. Localization signals can be any radio frequency signal used by tire monitor 22 to determine the position of a tire sensor that may or may not contain data. According to an exemplary embodiment, a data message may be used as a localization signal.

In this exemplary embodiment, tire sensors 24-30 are configured to transmit localization signals using frames of data. A frame of data consists of a header portion, including a tire sensor identification and tire sensor status, and the localization signal. Tire sensors 24-30 can be configured to send multiple redundant frames of data to reduce transmission failures caused by interference, multipath, and other sources of error. Tire sensors 24-30 are configured to transmit frames of data periodically, wherein the rate of transmission is greater when the vehicle is in motion than when the vehicle is idle. Receiver circuit 34 may include amplifying circuitry, filtering circuitry, buffering circuitry, demodulating circuitry, and/or other circuit elements necessary to receive wireless signals from tire sensors 24-30 via antenna 32;

Signal strength circuit 36 is coupled to receiver circuit 34 and is configured to determine the signal strengths of the wireless signals. As discussed with reference to FIG. 3, signal strengths can be used to determine a signal pattern. In this exemplary embodiment, signal strength circuit 36 generates a received signal strength indicator (RSSI) for each frame. Signal strength circuit 36 may be configured to measure a plurality of signal strength values for each frame. Signal strength circuit 36 may measure signal strength values for one or more of the first bit of each frame, the last bit of each frame, or any other bits in the frame.

Signal strength circuit 36 uses RSSI in this exemplary embodiment, but may alternatively use other measures of signal strength. RSSI is calculated in this exemplary embodiment by demodulating the selected bit or bits of the frame or message. The demodulated bit or bits are associated with an RF power (i.e., signal strength), and are digitized with an analog-to-digital (A/D) converter. The output of the A/D converter provides the RSSI counts of the sample. RSSI may be generated for either frequency-modulated (FM) or amplitude-modulated (AM) signals.

Processing circuit 38 is configured to store predetermined signal patterns provided by signal strength circuit 36 in memory 40 for a wireless signal transmitted by each tire sensor. Processing circuit 38 is configured to associate the positions of the tires on vehicle 12 (e.g., left front, right front, right rear, and left rear) with the predetermined signal patterns of the wireless signals for that position. In one exemplary embodiment, discussed with reference to FIG. 4, processing circuit 38 is configured to detect a pulsed signal, to determine signal strength for each pulse in the pulsed signal, to compare a pattern of the signal strengths to one or more predetermined patterns stored in memory 40, and to determine the position of the tire on the vehicle based on the comparison.

Processing circuit 38 is further configured to communicate with a display 60 and an operator input device 62. Processing circuit 38 may be configured to generate display signals for display of tire characteristic data along with the position of the tire associated with the tire characteristic data on display 60. Operator input device 62, which may include a button, switch, touch screen, voice recognition device, etc. may be used by the operator to select characteristic data to be displayed from memory 40 via processing circuit 38. Operator input device 62 may further be used to calibrate tire monitor 22 initially, as will be described in exemplary form in FIG. 4 hereinbelow.

Figure 3:
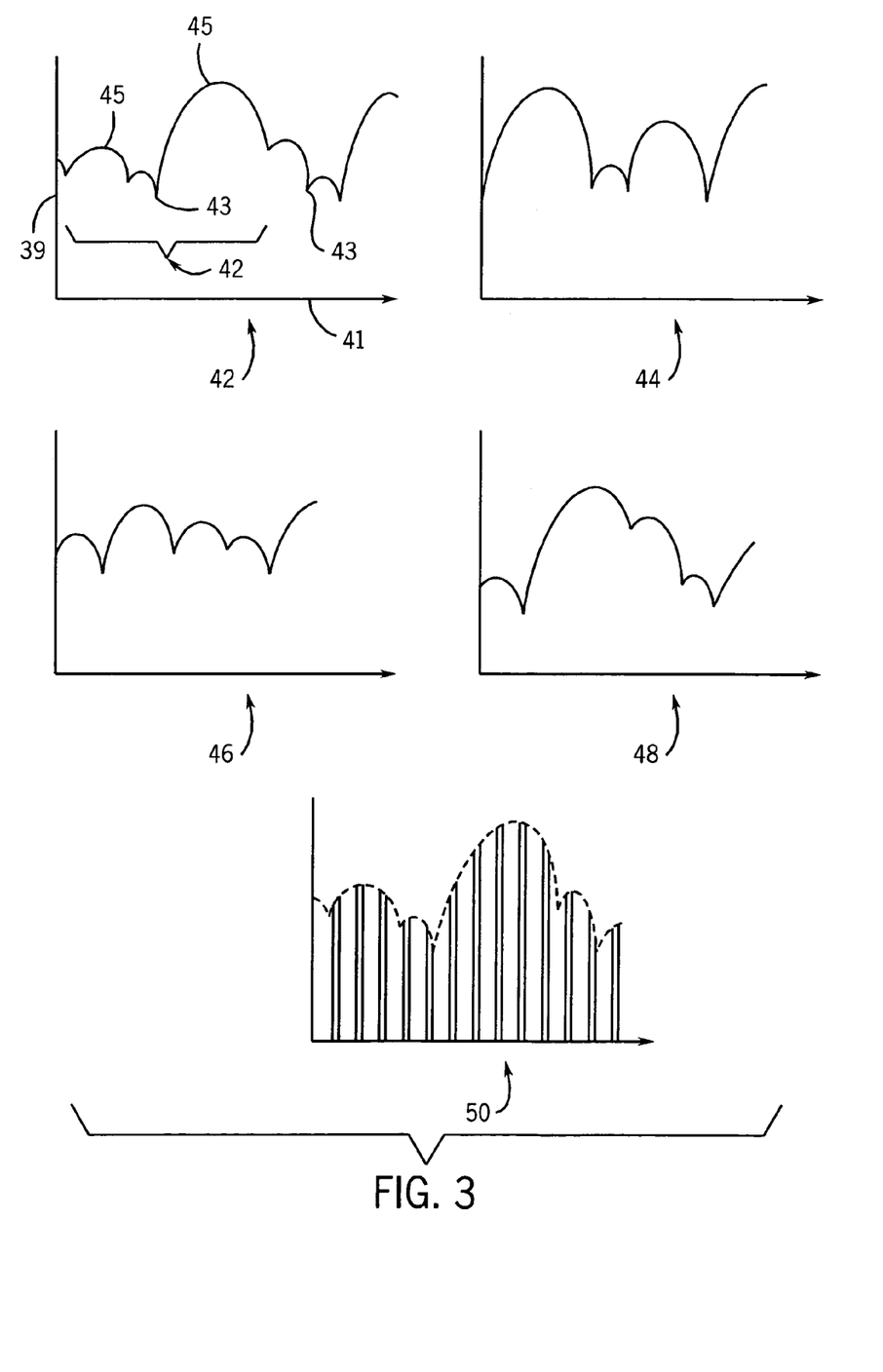
FIG. 3 is a series of graphs illustrating predetermined signal strength patterns associated with tire locations on a vehicle and a received plurality of signal pulses, according to an exemplary embodiment.

Referring to FIG. 3, a first graph 42 illustrating a signal strength pattern associated with a tire on vehicle 12 stored by processing circuit 38 in memory 40 is illustrated. A first axis 39 reflects the signal strength of the received pulse; a second axis 41 reflects the time the pulse was received. The signal strength pattern is formed based on a localization signal that is transmitted from a tire sensor to tire monitor 22 while the tire is rotating. The localization signal, sent to form the signal strength pattern during a training or initialization phase as described below, is generally transmitted for approximately 200 milliseconds according to an exemplary embodiment, but may alternatively be transmitted for any other duration. A transmitted signal may be transmitted at travelling speeds such that the signal is transmitted during at least approximately one tire rotation. Generally, at travelling speeds, a tire rotation takes 80 milliseconds.

According to an exemplary embodiment, the strength of the localization signal emitted by a transmitter is approximately constant. However, the distance, angle, and any interfering objects, such as, the vehicle frame, etc. affect the signal strength received at tire monitor 22 uniquely for each tire position. In addition, various conductive shielding shapes can be implemented in or around tires 14-20 (e.g., in the wheel wells) to create desired or unique frequency distribution patterns at each of tires 14-20. A high degree of interference along the transmission path will reduce the received signal strength, represented on graph 42 by relatively low points 43, and a low degree of interference will reduce the received signal strength less, represented on graph 42 by relatively high points 45.

Further, the tire sensor is positioned on a rotating tire. The position of the tire sensor relative to tire monitor 22 and any interfering objects changes as the tire rotates. Accordingly, the received signal strength detected by tire monitor 22 will change as the tire rotates. The change in the position of the tire sensor relative to tire monitor 22 as the tire rotates is related to the change in the signal strength received at tire monitor 22. Because the position of the tire sensor relative to tire monitor 22 repeats as the tire completes a first full rotation and begins further rotations, a repetitive pattern 47 can be seen in graph 42. Repetitive pattern 47 repeats coincidentally with a full rotation of the tire.

Accordingly, a unique repeating pattern of received signal strengths can be captured and stored in memory 40 for each tire sensor position on a vehicle. The unique signal strength pattern for each tire position can be stored in memory 40 using a training process during manufacture before the tire sensor position determining process begins. Alternatively, the training process can be performed each time the vehicle is operated, periodically by a servicing department, etc.

First graph 42 shows a pattern of signal strengths which may be representative of a first tire sensor position on a vehicle, e.g. the right front tire position, while a second graph 44 shows a pattern of signal strengths which may be representative of a second tire sensor position on the vehicle, e.g. the left front tire position, a third graph 46 shows a pattern of signal strengths which may be representative of a third tire sensor position on the vehicle, e.g. the right rear tire position, and a fourth graph 48 shows a pattern of signal strengths which may be representative of a fourth tire sensor position on the vehicle, e.g. the left rear tire position. According to alternative embodiments, more or fewer patterns can be associated with a vehicle, such as for a semi-truck, a motorcycle, a vehicle including a spare tire, etc.

In prior systems, during operation, a tire sensor transmitting from a tire would send a complete, continuous signal to tire monitor 22 for comparison to the stored predetermined signal strength patterns. Accordingly, a received signal strength pattern would appear similar to the patterns shown in graphs 42-48. However, it is possible to match a received signal to the stored predetermined signal strength patterns using less than a complete uninterrupted signal to tire monitor 22, i.e., by using a pulsed signal, as will now be described.

According to an exemplary embodiment, a tire sensor can be configured to transmit signal pulses over a period of time using a 20% duty cycle. Using a 20% duty cycle, the tire sensor would transmit a signal pulse for 20% of a transmission cycle and transmit nothing for the remaining 80% of the transmission cycle. For example, for a 100 microseconds transmission cycle, the tire sensor would transmit for 20 microseconds and not transmit for 80 microseconds. The transmission during the 20% of a transmission cycle can be defined as a signal pulse. The overall signal can be defined as a pulsed signal. Various duty cycles, such as between 5 and 50%, and transmission cycles, such as any cycle between 50 and 500 microseconds can be used to maximize conservation of battery strength, strength of transmission signal, receptivity at tire monitor 22, comparability to the stored predetermined signal patterns, etc.

According to an exemplary embodiment, a localization signal in a frame of data can be transmitted from a tire sensor using a 20% duty cycle to tire monitor 22. The header portion of the frame, described above with reference to FIG. 2, can be transmitted in a standard continuous signal to preserve the data therein; i.e., the tire sensor sends the complete header without pulsing so that the header portion of the signal can be received and interpreted by tire monitor 22. After completing transmission of the header portion, the tire sensor can begin transmitting signal pulses using the 20% duty cycle. Accordingly, the tire sensor will transmit a localization signal as a series of signal pulses. The duration of each pulse can be less than the time that it takes a tire to complete approximately one rotation at travelling speeds. Preferably, the duration of each pulse is a relatively small fraction of the time that it takes a tire to complete approximately one rotation at travelling speeds. Generally, travelling speeds can be defined as speeds where a tire makes a full rotation in approximately 80 milliseconds, or 40 miles per hour. However, travelling speeds can be other speeds as well, such as any speed between 1-2 miles per hour and 80 miles per hour or more.

According to an exemplary embodiment, operation of tire monitor 22 and/or the tire sensor can be related to the speed of vehicle 12. For example, the tire sensor can be configured to begin transmitting and/or tire monitor 22 can be configured to begin receiving only after vehicle 12 reaches travelling speed. A speed of vehicle 12 can be communicated to tire monitor 22 and/or the tire sensors using any of a variety of methods, such as a centrifugal-controlled switch coupled to each of the tire sensors or a speed signal placed on a vehicle communication bus which is coupled to tire monitor 22 and/or wirelessly coupled to the tire sensors.

Advantageously, a tire sensor using a pulsed signal can use less power than a tire sensor using a continuous signal. Generally, a tire sensor requires a significant amount of power while it is transmitting. A tire sensor using a duty cycle of 20% only transmits during 20% of the transmission cycle. Accordingly, a tire sensor have a duty cycle of 20%, transmitting at the same power as a tire sensor transmitting a continuous signal will use approximately one fifth of the power. Conserving power is advantageous because tire sensors are often powered by a battery and replacement of the battery can be expensive and time consuming. Because one fifth of the power expended during transmission is consumed using a 20% duty cycle as described above, battery life can be prolonged up to five times.

Additionally, the FCC limits the strength of signals that can be output from transmitters such as those used by the tire sensors. The FCC limits prohibit a transmitter from exceeding a maximum average signal strength over a defined transmission cycle. However, short, high-strength transmissions in a pulsed signal followed by a period of inactivity can have the same average signal strength over the defined transmission cycle as low-strength, sustained transmissions in a continuous signal. Because higher-strength transmissions can be used in a pulsed signal, receptivity at the receiver can be improved.

Referring again to FIG. 3, a graph 50 illustrating a signal strength pattern for a pulsed signal is illustrated. According to an exemplary embodiment, tire sensor 24 will transmit a series of signal pulses to tire monitor 22 for some duration. As each pulse is received at the tire monitor 22, the signal strength of the signal pulse can be determined by signal strength circuit 36. The signal strength of each pulse can be recorded in graph 50.

The set of signal strengths determined for the pulses in the pulsed signal can define a received signal pattern for the pulsed signal. The received signal pattern can be used to determine characteristics of the received signal pattern such as a minimum received signal strength, a maximum received signal strength, a mean, a variance, etc.

Processing circuit 38 can compare these characteristics of the received signal pattern for a pulsed signal to similar characteristics of a predetermined signal pattern to determine whether the pulsed signal correlates with the predetermined signal pattern. In the exemplary embodiment shown in FIG. 3, the pattern in graph 50 roughly correlates to the pattern in graph 42. Although the continuous pattern in graph 42 is not received in the pulsed signal, the pulsed signal provides enough data such that a comparison can be made between the received signal pattern and the continuous pattern in graph 42 to recognize the correlation. The comparison can be implemented using standard mathematical algorithms and digital processing techniques that are well known in the art.

In this exemplary embodiment, tire monitor 22 compares the predetermined signal patterns to a received signal pattern to identify the position of a tire sensor that is the source of the pulsed signal. For example, the strength of each signal pulse in the pulsed signal is compared to an expected strength based on the predetermined signal pattern. According to an alternative embodiment, the strengths of pulsed signal may be used to approximate a curve using, for example, least square approximation. This approximated curve can be compared to the predetermined signal pattern to determine a tire position.

Various factors may temporarily affect the strength of a received signal pulse, such as road conditions, road debris, dirt, snow or other foreign objects between the tire sensor and tire monitor 22, etc. Accordingly, tire monitor 22 can compare multiple characteristics of the received signal pattern to the predetermined signal patterns, and select the predetermined signal pattern with the highest correlation. These characteristics to be compared may include: a mean, a variance, position of mode or highest peak, position of mode relative to minimum, maximum, or mean, squared difference of each signal strength between the received pattern (i.e., an incoming pattern) and each of the predetermined patterns to find the predetermined pattern having least squared difference from the received pattern, etc. Other characteristics or calculation may be also used to determine the best correlation between the pulsed signal and the predetermined patterns. Accordingly, tire monitor 22 determines that the position of the tire identified by the signal pulses in the received signal pattern is, for example, the right front tire position because the received signal pattern most closely correlates with the predetermined signal pattern for the right front tire position.

When using a pulsed signal, it is advantageous to synchronize the timing of transmission for the transmitter circuit in the tire sensor with the timing of the receiver circuit in tire monitor 22 to facilitate reception and recognition of the signal pulses by tire monitor 22. Synchronization can reduce the likelihood of receiving a signal pulse from some other source, missing a signal pulse due to fading, misinterpreting noise as a signal pulse, etc. However, various factors can affect the timing (e.g. by affecting the clock signals) of both the tire sensors and tire monitor 22, such as external forces, temperature, age of circuit components, battery power, battery age, etc. When the timing of the tire sensors and/or tire monitor 22 is affected, the tire monitor 22 and the tire sensors may no longer be synchronized. Accordingly, it is advantageous to use a synchronization technique to periodically re-synchronize the timing of the tire sensors with the timing of tire monitor 22. According to an exemplary embodiment, tire monitor 22 can maintain multiple timings corresponding with the timings for each tire sensor on vehicle 12.

According to an exemplary embodiment, synchronization can occur during the transmission of the pulsed signal. Processing circuit 38 can compare the RSSI from receiver circuit 34 to a threshold value that is above the receiver noise floor using a hardware comparator. When the RSSI from receiver circuit 34 exceeds the threshold value (indicative of a signal pulse), the hardware comparator can produce an output. The output of the comparator can provide an interrupt to processing circuit 38 such that processing circuit 38 receives an interrupt signal whenever the RSSI rises above the threshold value. Upon receiving the interrupt, the timing for tire monitor 22 can be restarted. Restarting the timing for tire monitor 22 when a signal pulse is received will synchronize the timing of tire monitor 22 with the timing of the tire sensor. The described synchronization can be implemented such that signal noise, dropped signals and/or any other type of interference can be recognized and compensated for using any of a variety of algorithms that are well known in the art.

According to an alternative embodiment, synchronization of the timing of tire monitor 22 with tire sensor 22 can be implemented using a software based implementation. Using a software-based implementation, tire monitor 22 oversamples the wireless signal from the tire sensor, receiving even when the tire sensor is not transmitting. For example, tire monitor 22 can sample the wireless signal beginning at any point during the pulsed signal and continue to sample the wireless signal over the course of one or more additional pulses. The received signal will include lows during which no signal was received and peaks during which a signal was received. The received signal can be filtered using a low-pass filter to detect the peaks in the received signal and the timing of those peaks, i.e. when they were received, the time between peaks, etc. The peaks are generally representative of signal pulses from a pulsed signal transmitted by the tire sensor and tire monitor 22 can use these peaks to recreate the pulsed signal. Further, tire monitor 22 can examine the timing of the peaks to recognize the timing of the tire sensor and synchronize with the tire sensor by adjusting its own timing accordingly.

Other synchronization techniques can include using hardware technology to filter the signal pulses and increase the time during which tire monitor 22 is expecting a signal pulse, such that the signal pulses are easier to recognize, analyzing the received signal during the transmission of the identification and status bits to calibrate the relative timing of tire monitor 22 and the tire sensor, resynchronizing on a rising edge of received signals that have a high signal strength, etc. The above techniques are provided as examples, but any method or system for determination by tire monitor 22 or associated circuitry of the timing of signals transmitted by the tire sensor could be used.

In an exemplary application, when a new tire is provided to vehicle 12, or tires 14-20 have been rotated, tire monitor 22 is configured to detect the change and adjust the display of tire characteristics accordingly. Tire monitor 22 receives pulsed signals from each of the tire sensors in their new positions. Tire monitor 22 is configured to determine signal strength patterns for each of tire sensors 24-30 associated with tires 14-20, based on the localization signal transmitted in a pulsed signal by each of tire sensors 24-30. Tire monitor 22 is further configured to compare each pulsed signal to the predetermined patterns stored in memory 40 to determine the new positions of the tire or tires that have changed position, or the position of a new tire. Tire monitor 22 is then configured to store the new tire positions in memory 40, and/or provide the new tire positions on display 60.

Figure 4:
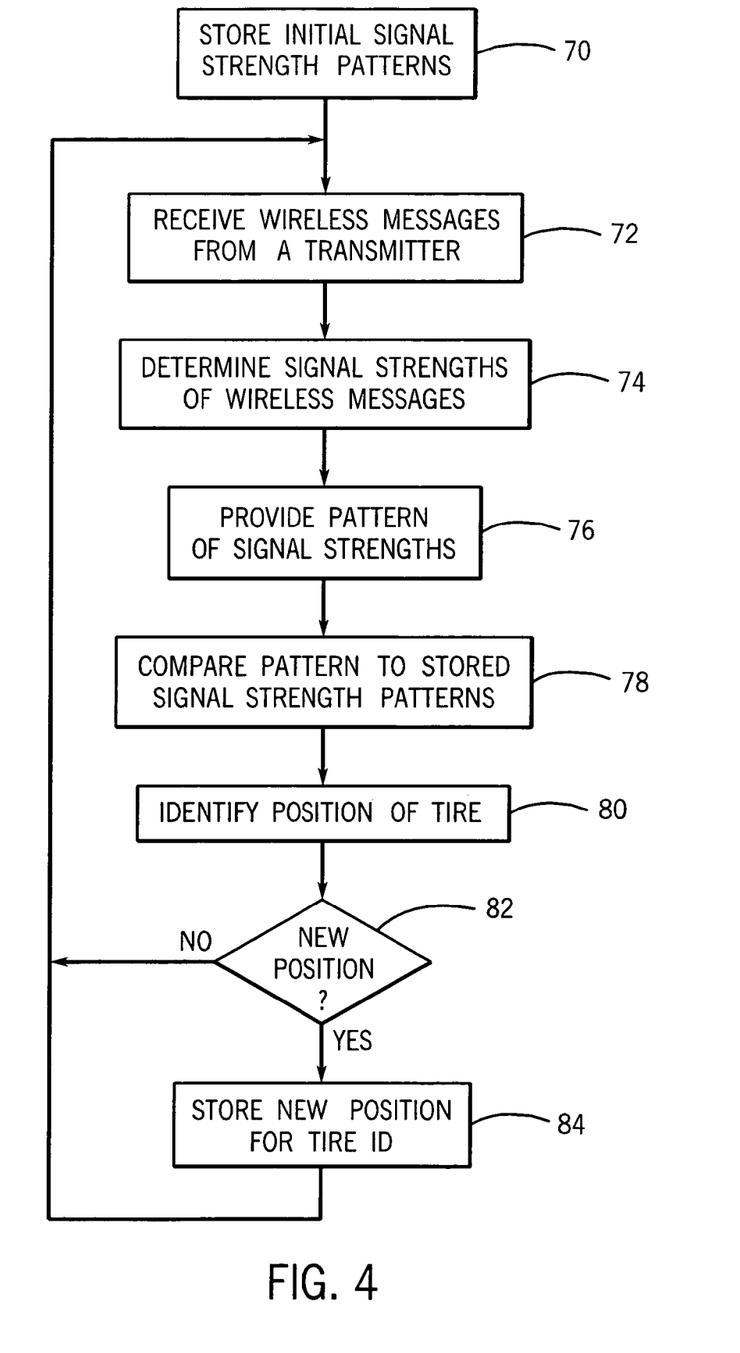
FIG. 4 is a flowchart of a method of determining the position of a tire on a vehicle, according to an exemplary embodiment.

Referring now to FIG. 4, an exemplary method of identifying the position of a tire sensor on a vehicle using pulsed signals will now be described. It is understood that one or more of the steps in this exemplary method may be eliminated or rearranged in various embodiments. At step 70, initial signal strength patterns are stored in memory 40 of tire monitor 22. As mentioned, the initial or predetermined signal strength patterns may be provided by testing of the vehicle 12 during manufacture. Alternatively, the purchaser of a new vehicle or the purchaser of a new tire monitoring system 10 may use operator input device 62 to initiate a calibration procedure to train tire monitor 22 to store predetermined signal strength patterns in memory 40. For example, tire monitor 22 may display a tire identification on display 60, and the operator may input the tire position associated with that tire identification using operator input device 62, wherein the tire identification can be read from a label affixed to each of tire sensors 24-30 on their associated tires. Various other techniques are contemplated for storing initial signal strength patterns in step 70, including updating the stored signal strength patterns during the lifetime of the system.

At step 72, after calibration or training in step 70, tire monitor 22 enters an operation phase during which pulsed signals are received from transmitter circuits associated with tire sensors 24-30. Tire monitor 22 can implement the resynchronization techniques described above to synchronize the timing of tire monitor 22 with the timing of a tire sensor during the transmission of the pulsed signal. At step 74, tire monitor 22 determines the signal strengths of the pulsed signals, for example, by using RSSI techniques and signal strength circuit 36. At step 76, processing circuit 38 is configured to provide a pattern of pulsed signal strength samples, for example, by saving the incoming pulsed signal strengths in memory 40.

In a step 78, wherein a sufficient number of signal pulses have been received for a given tire sensor, tire monitor 22 compares the pattern of signal pulse strengths, i.e. the received signal pattern, for one or more of tire sensors 24-30 with the predetermined signal strength patterns stored in step 70. One or more characteristics of the received signal pattern may be compared in step 78.

Following the comparison in step 78, in step 80, tire monitor 22 determines the position of the tire sensor transmitting the received signal pattern compared in step 78 based on the comparison. The determination can be made using the comparison method described above with reference to FIG. 3.

Following identification of the tire sensor position, a determination is made in a step 84 whether a change in position has occurred. If a change has occurred, tire monitor 22 stores the new position in memory 40 for the given tire identification at step 84. Optionally, the operator may receive an indication on display 60 that a new position for a tire ID has been determined, either in textual indication, audible indication, via a light-emitting diode or via a graphical or pictorial image (e.g., an icon). Following the determination of tire position, tire monitor 22 returns to step 72 to repeat the process for additional incoming wireless signals.

Advantageously, this exemplary method does not require manual intervention to identify tire positions, since tire monitor 22 automatically receives and processes wireless signals from tire sensors 24-30.

While the exemplary embodiments illustrated in the FIGURES and described above are presently preferred, it should be understood that these embodiments are offered by way of example only. For example, various techniques for comparing detected tire pressure monitor identifier signals with stored identifiers may be used. Further, the teachings herein may be applied to various types of vehicles, including cars, trucks, all-terrain vehicles, construction vehicles, etc. Accordingly, the present invention is not limited to a particular embodiment, but extends to various modifications that nevertheless fall within the scope of the appended claims.

What is claimed is:

1. A system for determining the position of a tire on a vehicle using a plurality of signal pulses, the system comprising:
   a memory configured to store a plurality of predetermined signal patterns, each predetermined signal pattern associated with a unique tire position on the vehicle; and
   a circuit configured to:
   periodically restart a timing of the circuit upon receipt of at least one of the plurality of signal pulses to synchronize a timing of the circuit with a timing of a transmitter,
   determine times of transmission of the plurality of signal pulses,
   detect the plurality of signals at approximately the determined times,
   compare the plurality of signal pulses to at least one of the predetermined signal patterns, and
   determine the position of the tire on the vehicle based on the comparison.

2. The system of claim 1, wherein the times of transmission are determined by synchronizing the circuit with the transmitter.

3. The system of claim 2, wherein the processing circuit is configured to perform synchronization using a hardware comparator.

4. The system of claim 2, wherein the processing circuit is configured to perform synchronization based on the application of a low-pass filter applied to an oversampled signal.

5. The system of claim 1, wherein the processing circuit is configured to compare a plurality of characteristics of the plurality of signal pulses with a corresponding plurality of characteristics of a predetermined signal pattern.

6. The system of claim 1, wherein the plurality of pulsed signals includes at least 10 pulsed signals transmitted in the time the tire completes approximately one rotation.

7. The system of claim 1, wherein the processor circuit is configured to determine if the tire has changed position on the vehicle based on the comparison of the plurality of pulsed signals to the predetermined signal patterns.

8. A system for determining the position of a tire on a vehicle using a periodically transmitted signal, the system comprising:
   a transmitter circuit associated with the tire configured to transmit a plurality of signal pulses in a time the associated tire completes approximately one rotation;
   a receiver circuit configured to receive the plurality of signal pulses;
   a memory configured to store a plurality of predetermined signal patterns, each predetermined signal pattern associated with a unique tire position on the vehicle; and
   a processing circuit configured to:
   periodically restart a timing of the receiver circuit upon receipt of at least one of the plurality of signal pulses to synchronize a timing of the transmitter circuit with the timing of the receiver circuit, and
   compare a signal pattern of the plurality of signal pulses to at least one of the predetermined signal patterns, and to determine the position of the tire on the vehicle based on a comparison.

9. The system of claim 8, wherein the plurality of pulsed signals includes at least 10 pulsed signals in the time the tire completes the approximately one rotation.

10. The system of claim 8, wherein the processor circuit is configured to determine if the tire has changed position on the vehicle based on the comparison of the plurality of pulsed signals to the predetermined signal patterns.

11. The system of claim 8, wherein the receiver circuit is configured to determine the time of transmission for the plurality of signal pulses.

12. The system of claim 11, wherein the time of transmission is determined by synchronizing the transmitter circuit and receiver circuit.

13. The system of claim 12, wherein the receiver circuit is configured to synchronize with the transmitter circuit using a hardware comparator.

14. The system of claim 12, wherein the processing circuit is configured to perform synchronization based on the application of a low-pass filter applied to an oversampled signal.

15. The system of claim 8, wherein the receiver circuit is configured to compare a plurality of characteristics of the plurality of signal pulses with a corresponding plurality of characteristics of a predetermined signal pattern.

* * * * *

UNITED STATES PATENT AND TRADEMARK OFFICE
CERTIFICATE OF CORRECTION

PATENT NO. : 7,574,293 B2  
APPLICATION NO. : 10/782539  
DATED : August 11, 2009  
INVENTOR(S) : Vredevoogd et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1421 days.

Signed and Sealed this

Seventh Day of September, 2010

David J. Kappos  
*Director of the United States Patent and Trademark Office*